US009511502B2

(12) United States Patent
Ishihara et al.

(10) Patent No.: US 9,511,502 B2
(45) Date of Patent: Dec. 6, 2016

(54) APPARATUS FOR CUTTING SHEET STACK

(71) Applicants: HITACHI METALS PRECISION, LTD., Minato-ku, Tokyo (JP); HITACHI METALS, LTD., Minato-ku, Tokyo (JP)

(72) Inventors: Shinya Ishihara, Yasugi (JP); Hiroshi Takatsuka, Yasugi (JP)

(73) Assignees: HITACHI METALS PRECISION, LTD., Tokyo (JP); HITACHI METALS, LTD., Tokyo (JP)

( * ) Notice: Subject to any disclaimer, the term of this patent is extended or adjusted under 35 U.S.C. 154(b) by 546 days.

(21) Appl. No.: 13/706,865

(22) Filed: Dec. 6, 2012

(65) Prior Publication Data

US 2013/0145917 A1 Jun. 13, 2013

(30) Foreign Application Priority Data

Dec. 9, 2011 (JP) ................................ 2011-269976

(51) Int. Cl.

| | |
|---|---|
| ***B26D 7/06*** | (2006.01) |
| ***B23D 57/00*** | (2006.01) |
| ***B27B 33/14*** | (2006.01) |
| ***B26D 1/00*** | (2006.01) |
| ***B26D 1/10*** | (2006.01) |
| *B26D 7/01* | (2006.01) |

(52) U.S. Cl.

CPC ............... *B26D 1/0006* (2013.01); *B26D 1/10* (2013.01); *B26D 7/015* (2013.01); *B26D 2001/006* (2013.01); *Y10T 83/9319* (2015.04)

(58) Field of Classification Search

CPC ......... B26D 1/0006; B26D 1/10; B26D 7/015; B26D 2001/006; Y10T 83/9319

USPC .............. 83/422, 835, 846–854, 679, 699.11

See application file for complete search history.

(56) References Cited

U.S. PATENT DOCUMENTS

| | | | | | |
|---|---|---|---|---|---|
| 92,600 | A | * | 7/1869 | Gaston et al. | 83/660 |
| 1,044,966 | A | * | 11/1912 | Adams et al. | 83/607 |
| 1,726,369 | A | * | 8/1929 | Smith | 83/388 |
| 2,219,602 | A | * | 10/1940 | Rayner | 83/607 |
| 3,277,764 | A | * | 10/1966 | Hene | 83/679 |
| 3,279,295 | A | * | 10/1966 | Teplitz | 83/601 |
| 3,824,887 | A | * | 7/1974 | Marchard | 83/679 |

(Continued)

FOREIGN PATENT DOCUMENTS

| | | |
|---|---|---|
| JP | 2004-114196 A | 4/2004 |
| JP | 2004-114198 A | 4/2004 |

(Continued)

*Primary Examiner* — Ghassem Alie
*Assistant Examiner* — Bharat C Patel
(74) *Attorney, Agent, or Firm* — Sughrue Mion, PLLC

(57) ABSTRACT

An apparatus for cutting a sheet stack is provided. The sheet stack is composed of a plurality of sheets. The apparatus includes a cutting blade having a plate form and having a cutting edge at one side extending along a cutting width direction. The cutting blade has at the one side: a plurality of projecting blade portions having ridge lines forming edge lines capable of thrusting and sawing cutting, the projecting blade portions projecting in a cutting direction; and a straight bottom portion between adjacent projecting blade portions. Cutting of the sheet stack is performed by applying a load to the cutting blade in the cutting direction, and by reciprocating the cutting blade along the cutting width direction.

5 Claims, 4 Drawing Sheets

(56) References Cited

U.S. PATENT DOCUMENTS 4,064,776 A * 12/1977 Walitalo .............. B29C 65/7412
83/16
4,351,210 A * 9/1982 McKindary ..................... 83/835
4,620,467 A * 11/1986 Margraf et al. ................. 83/389
4,677,749 A * 7/1987 Brison ...................... B26B 9/02
30/277.4
4,852,442 A * 8/1989 Pottorff ........................... 83/697
D304,796 S * 11/1989 Mendenhall ................... D7/696
5,001,956 A * 3/1991 Nitsch ............................ 83/620
5,038,477 A * 8/1991 Parrow ........................... 30/253
5,133,132 A * 7/1992 Yu ............................ B26B 9/02
30/286
5,251,524 A * 10/1993 Clifford .......................... 83/383
5,768,969 A * 6/1998 Dalfiume ........................ 83/660
6,065,380 A * 5/2000 Lundh .................. B23D 61/121
30/355
6,823,593 B2 * 11/2004 Dunn-Rankin ........... B26B 9/02
30/346.56
7,032,360 B2 * 4/2006 Rutten et al. ................... 53/399
7,047,855 B2 * 5/2006 Beccari ........................... 83/227
7,726,640 B2 * 6/2010 Nochi et al. ............... 270/58.07
8,690,141 B2 * 4/2014 Sugiyama ....................... 270/32
2004/0144228 A1 * 7/2004 Gross et al. .................... 83/561
2006/0081106 A1 * 4/2006 Nishimura et al. ............. 83/665
2008/0308990 A1 * 12/2008 Nochi et al. ............... 270/58.07
2010/0320673 A1 * 12/2010 Takata ............................ 270/37

FOREIGN PATENT DOCUMENTS

JP 2005-161448 A 6/2005
JP 2010-089252 A 4/2010
JP 2010089252 A * 4/2010

* cited by examiner

APPARATUS FOR CUTTING SHEET STACK

FIELD OF THE INVENTION

The invention relates to an apparatus for cutting a sheet stack. It particularly cut off an end or an edge of the sheet stack which is stacked of a plurality of sheets, e.g., a book or a magazine during bookbinding, a booklet composed of punched, saddle-stitched or v-folded sheets of paper handled in a copying machine or the like, or stacked sheets including a resin material and a sealing material.

DESCRIPTION OF RELATED ART

An apparatus for cutting a sheet stack applicable to cutting of the above-described sheet stack has been proposed in JP-A-2010-89252. The proposed cutting apparatus is capable of cutting the sheet stack placed between a cutting blade in a form of a plate and a receiving member opposed to the cutting blade. The cutting blade is reciprocated along a cutting width direction parallel to the sheet stack and simultaneously the cutting blade is moved in a cutting direction while applying a load to the cutting blade. The cutting blade has a plurality of projecting blade portions at one side extending along the cutting width direction.

The plurality of projecting blade portions have ridge lines forming edge lines which is capable of thrusting and cutting in a sawing manner. The projecting blade portions project in the cutting direction and thrust into the sheet stack when the cutting blade is moved in the cutting direction, and the sheet stack is cut with the projecting blade portions in the thrust state when the cutting blade is moved along the cutting width direction. Thus, two cutting operations are enabled.

The cutting apparatus using the above-described projecting blade portions can thrust into the sheet stack and an amount of thrust is increased if the sharpness of the ridge lines of the projecting blade portions is improved or if the load applied to the cutting blade in the cutting direction is increased. Therefore, a time required for cutting the sheet stack is reduced due to the increased amount of thrust in comparison with a case of a cutting blade having a straight ridge line as an edge line and having no a plurality of projecting blade portions. Also, since the amount of contact of the edge with the sheet stack is largely reduced, heat generation at the time of cutting is suppressed.

SUMMARY OF THE INVENTION

There is, in particular, a practical demand for the sheet stack cutting apparatus to complete its cutting of the sheet stack within a required cutting time recited in a specification and to perform the predetermined number of cutting (cutting life) recited in the specification while maintaining the required cutting time within the predetermined time.

The inventors further made a study on the cutting blade of the cutting apparatus of JP-A-2010-89252 and found that ridge lines of the edge lines of the projecting blade portions, particularly the projecting ends thereof, are worn as a number of cutting is increased, and thus sharpness for cutting is lost, and thereby a time required for cutting tends to increase. The inventors then increased the load applied to the cutting blade in the cutting direction and the cutting blade reciprocating speed on a trial basis in order to reduce the time required for cutting. However, wearing of the ridge lines of the projecting ends of the projecting blade portions was accelerated. The time required for cutting was increased and the number of cutting times (cutting life) was reduced.

An objective of the invention is to solve the above-described problem of wearing of the cutting blade disclosed in JP-A-2010-89252 and to provide a novel practical sheet stack cutting apparatus by providing a cutting blade capable of increasing the number of cutting times (cutting life) while maintaining the required cutting time within a predetermined time.

The inventors studied modes of thrusting of the cutting blade edge portions of the cutting blade, and found that the above-described problem can be solved by providing a structure of the cutting blade such that the mode of thrusting the projecting blade portions into a sheet stack can be made proper, and thereby achieved the invention.

The invention provides a sheet stack cutting apparatus capable of cutting a sheet stack composed of a plurality of sheets, including a cutting blade in plate form having edges at one side extending along a cutting width direction. The cutting blade has at the one side a plurality of projecting blade portions having ridge lines forming edge lines capable of thrusting and sawing cutting. The projecting blade portions project in a cutting direction (a direction toward the sheet stack), and a straight bottom portions are formed between adjacent projecting blade portions. The cutting of the sheet stack is performed by applying a load to the cutting blade in the cutting direction, and by reciprocating the cutting blade along the cutting width direction.

Preferably, a straight portion in the straight bottom portion is configured so that a length of the straight portion is 1 mm or more. Also, the straight bottom portion may have a ridge line forming an edge line capable of cutting the sheet stack along the cutting width direction.

Preferably, the projecting blade portions are configured so that the projection portions project by 0.05 mm to 1.0 mm from the straight bottom portion to the projecting end in a direction perpendicular to the straight bottom portions. A distance between adjacent tips of the projecting blade portions is preferably not smaller than 1.5 mm, more preferably not smaller than 2.0 mm. The projecting blade portions which have a distance (Ly) between adjacent projecting tips of the projecting blade portions, and a distance (Lx) between each base point for the projecting blade portions, is formed such that a distance ratio (Lx/Ly) is 010 to 0.40, more preferably 0.20 to 0.35.

According to the invention, the number of cutting (cutting life) can be extended while a required cutting time is maintained within a predetermined time. Therefore, a sheet stack cutting apparatus having an elongated life in comparison with the conventional apparatus can be obtained. As a result, the frequency for changing the cutting blade can be reduced and thus the invention can contribute to reduce a cost required for cutting sheet stacks.

DETAILED DESCRIPTION OF THE INVENTION

As described above, an important feature of the invention resides in a cutting blade having a particular shape. Before detailed description of the cutting blade, an entire construction of an apparatus for cutting a sheet stack will be described with reference to FIGS. 1 and 2.

Figure 1:
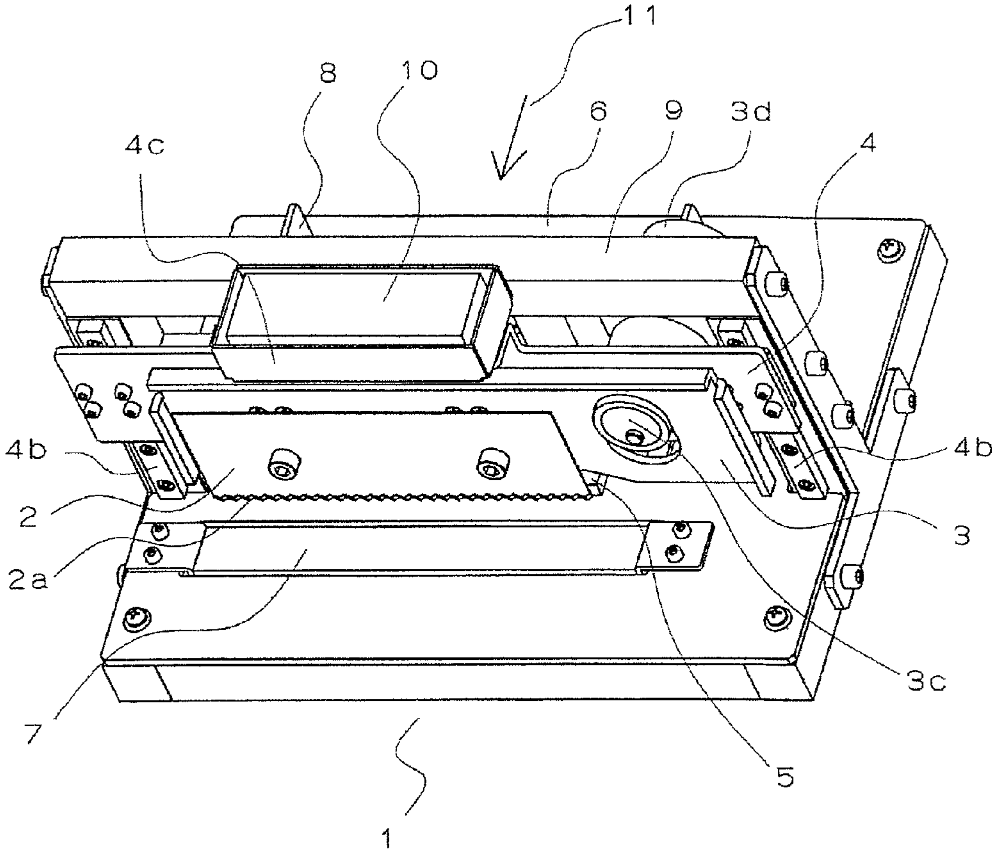
FIG. 1 is a view of an example of an apparatus for cutting a sheet stack according to the invention.
Figure 2:
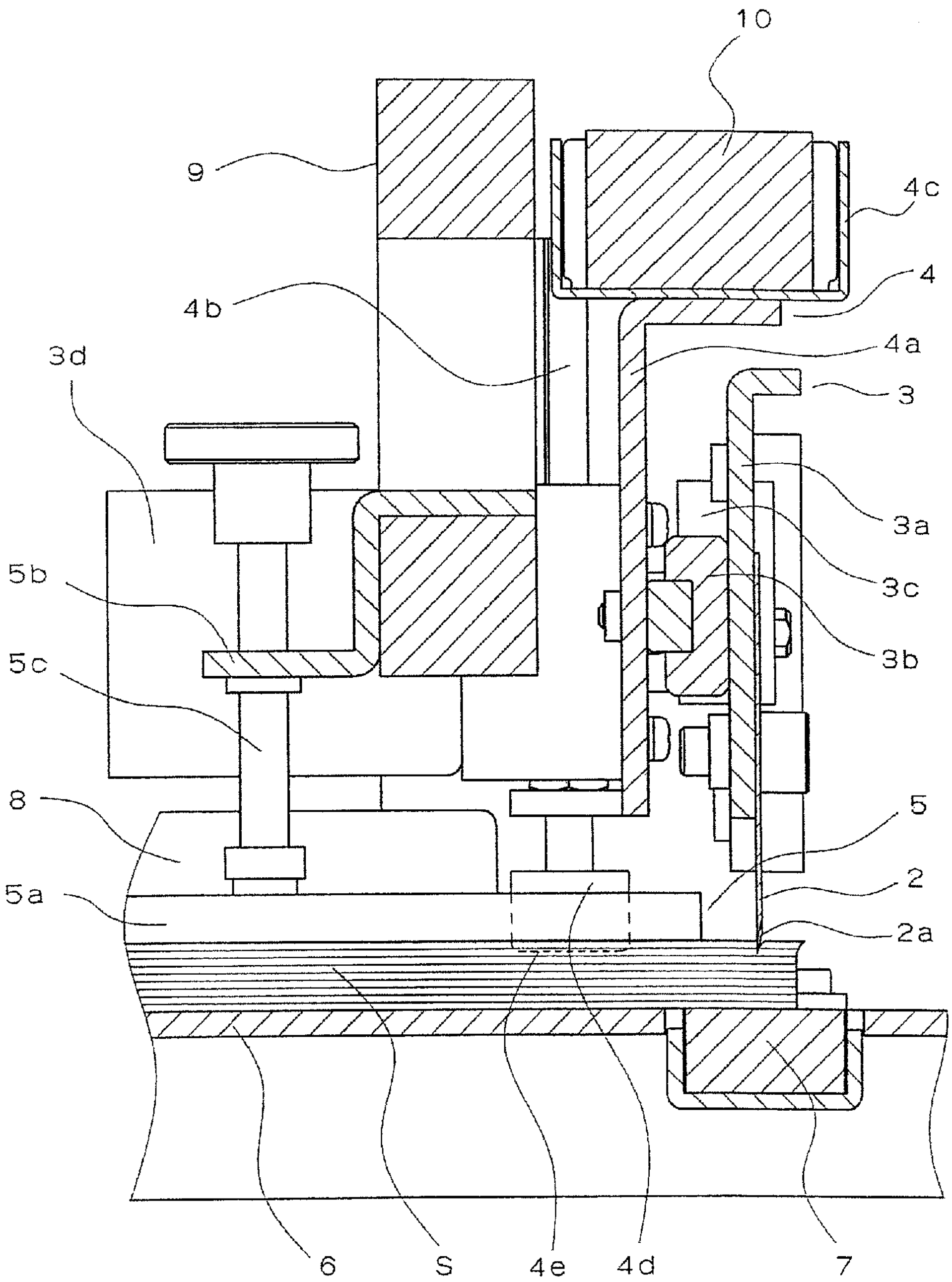
FIG. 2 is a view of the apparatus of FIG. 1 during cutting a sheet stack.

FIG. 1 shows an example of the apparatus for cutting a sheet stack according to the invention (hereinafter referred to as "cutting apparatus 1"). FIG. 2 is a side view of the cutting apparatus 1 shown in FIG. 1 during cutting a sheet stack. The sheet stack referred to in the description means a plurality of sheets having, for example, prints of images thereon and provided in a stack or booklet form by simply stacked or v-folded. A portion to be cut in the sheet stack is ordinarily an end portion parallel to a back portion of the sheet stack or a side portion perpendicular to the back portion.

The cutting apparatus 1 comprises: a placement table 6 for placing a sheet stack S with respect to a frame base 9; pressing means 5 for pressing the sheet stack S against the placement table 6; reciprocating means 3 for reciprocating a cutting blade 2 along a cutting width direction; cutting direction movement means 4 for moving the cutting blade 2 in a cutting direction and in a returning direction opposite to the cutting direction; loading means (including a weight 10) for applying a load to the cutting blade 2 in the cutting direction; and a receiving member 7 for receiving the projecting blade portions 2*a* of the cutting blade 2. The cutting apparatus may also include guide members 8 for guiding the sheet stack S in the width direction of the sheet stack S, on the placement table 6 at opposite sides of the table so that the sheet stack S can be aligned and inserted from a direction indicated by arrow 11.

The reciprocating means 3 includes: a cutting blade holding member 3*a* for mounting the cutting blade 2; a linear slider 3*b* which sliding direction is the cutting width direction and mounting the cutting blade holding member 3*a* on its sliding side and a cutting direction movement means 4 on its fixed side; an eccentric cam 3*c* engaged with the cutting blade holding member 3*a* to move the cutting blade holding member 3*a* along the cutting width direction; and a motor 3*d* mounted on the cutting direction movement means 4 and connected to a rotating shaft of the eccentric cam 3*c* to rotationally drive the eccentric cam 3*c*.

The reciprocating means 3 is capable of moving the cutting blade holding member 3*a* with the cutting blade 2 along the cutting width direction by one reciprocating cycle with one revolution of the motor 3*d*. A distance that the cutting blade 2 goes and returns can be set by simple means. More specifically, when the eccentricity of the rotating shaft of the eccentric cam 3*c* is set to e.g. 10 mm, the cutting blade 2 can be caused to go and return by 20 mm along the cutting width direction. When the eccentricity of the rotating shaft of the eccentric cam 3*c* is set to e.g. 5 mm, the cutting blade 2 can go and return by 10 mm long the cutting width direction. The reciprocating movement of the cutting blade 2 along the cutting width direction can be controlled by changing the number of revolutions of the motor 3*d* according to the degree of cutting resistance acting on the cutting blade 2.

The cutting direction movement means 4 includes: a slide frame 4*a* on a fixed side of the linear slider 3*b* in the reciprocating means 3 with the cutting blade 2; a pair of linear sliders 4*b* respectively provided on the slide frame 4*a* at opposite sides thereof along the cutting width direction, wherein the slide frame 4*a* is mounted on the sliding side and the frame base 9 is mounted on the fixed side; a stopper 4*d* provided at the forward side of the slide frame 4*a* and having an abutment surface 4*e* capable of abutting against a surface of the placement table 6; and a drive source (not shown) such as a motor capable of moving the slide frame 4*a* in the cutting direction and the returning direction.

The loading means for applying a load to the cutting blade 2 in the cutting direction may use a plummet 10 as well as other weights, i.e., the weights of the members and moving with the cutting blade 2 and constituting the above-described reciprocating means 3 and cutting direction movement means 4. A weight container 4*c* for containing the plummet 10 is provided on the top of the slide frame 4*a*.

The pressing means 5 includes: a pressing plate 5*a* to be brought into contact with the sheet surface of the sheet stack; a fixed frame 5*b* mounted on the frame base 9; and a bolt member 5*c* screwed into a tapped hole provided in the fixed frame 5*b* and having its end portion engaged with the pressing plate 5*a*. When the position and attitude of the sheet stack are fixed by pressing the sheet stack between the pressing means 5 and the placement table 6, the pressing plate 5*a* may be advanced by turning the bolt member 5*c*. Conversely, when the sheet stack is released from the pressed state, the pressing plate 5*a* may be retreated by turning the bolt member 5*c* in the opposite direction.

A force pressing the sheet stack may be set such that a sheet stack is not shifted from the proper position during cutting, and a sheet surface of the sheet stack is not creased or scratched by pressing. The pressing of the sheet stack can be automated, for example, by connecting a drive source such as a motor to the bolt member 5*c*. The pressing means may be configured to use an elastic member such as a spring, a pressure loading device such as a motor-driven cylinder, or a mechanism including a cam or a lever.

Cutting of the sheet stack by the cutting apparatus 1 having the above-described construction is performed as described below. The cutting blade 2 is reciprocated along the sheet stack width a direction, i.e., the cutting width direction, by the reciprocating means 3 while a load is applied to the cutting blade 2 in the cutting direction by the loading means. The cutting blade 2 is simultaneously moved in the cutting direction, i.e., the direction toward the sheet stack, by the cutting direction movement means 4. The cutting blade 2 is moved in this way to pass through the sheet at the lowermost position in the sheet stack until reach the receiving member 7. By this sequence of movements of the cutting blade 2, the sheets in the sheet stack are successively cut through the entire width from an uppermost sheet, and one or a plurality of the sheets are perforated and partially cut and simultaneously cut in a sawing manner. By repeating this cutting, the entire sheet stack is cut through the entire width in the end. The cutting blade 2 is thereafter moved in the returning direction by the cutting direction movement means 4 to a standby position.

Particularly important technical features of the invention will now be described in detail.

A feature of the invention resides in a structure of a cutting blade configured so that thrusting of the sheet stack with the projecting blade portions is made proper. More specifically, the cutting blade has a plate form and has blade edges at its one side extending along the cutting width direction. The cutting blade has, at the one side, a plurality of projecting blade portions having ridge lines forming edge lines that are capable of thrusting and sawing cutting. The blade edge portions project in the cutting direction, i.e., in the direction toward the sheet stack. The cutting blade also has straight bottom portions between the adjacent projecting blade portions. That is, the amount of thrust into the sheet stack can be limited by using a cutting blade having a structure of a combination of the projecting blade portions and the straight bottom portions. The load applied to the cutting blade in the cutting direction can be reduced in this way to solve the above-described problem.

The cutting blade according to the invention will be described in detail with reference to an example.

Figure 3A:
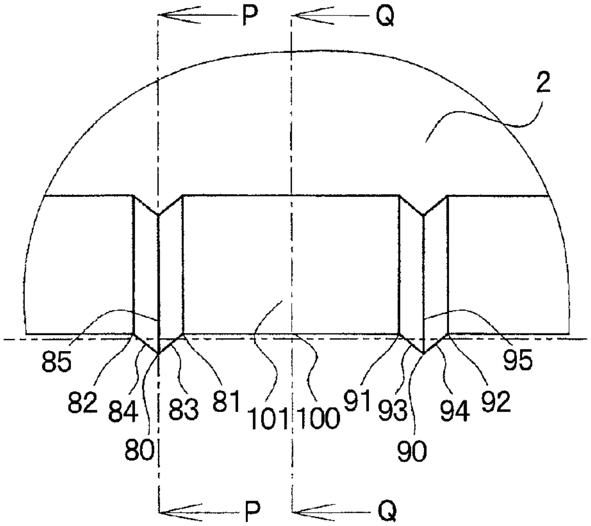
FIG. 3A is a front view of an example of edge of a cutting blade according to the invention.
Figure 3B:
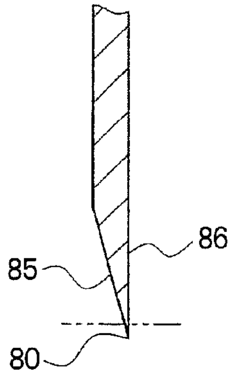
FIG. 3B shows a cross section of the edge of the cutting blade along a line P-P of FIG. 3A.
Figure 3C:
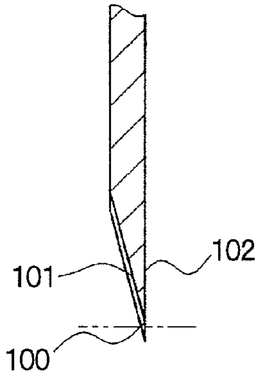
FIG. 3C shows a cross section of the edge of the cutting blade along a line Q-Q of FIG. 3A.
Figure 3D:
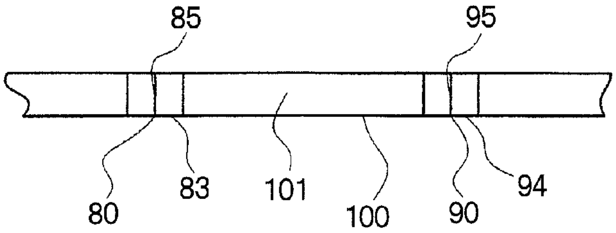
FIG. 3D shows a straight bottom portion of the cutting blade along a line Q-Q of FIG. 3A.
Figure 4:
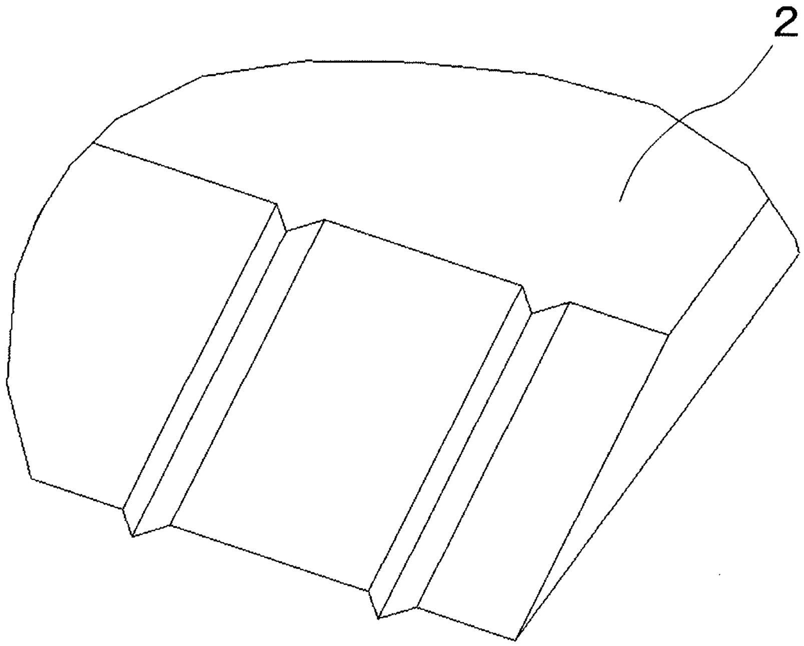
FIG. 4 is a perspective view of an edge portion of an example of a cutting blade according to the invention.

FIGS. 3A to 3D and 4 show an example of a cutting blade according to the invention. FIGS. 3A to 3D and 4 are enlarged views of an essential portion at the one side extending along the cutting width direction including the projecting blade portions 2*a* of the cutting blade 2 of FIG. 1. FIG. 4 is a perspective view of the near of a side edge part in a width direction of the cutting blade 2. FIGS. 3A to 3D show two projecting blade portions and a straight bottom portions, in the neighbor of the edge. Referring to FIGS. 3A to 3D, a plate surface of the plate member forming the cutting blade 2 is referred to as "front surface". A surface at the one side seen from the blade edge side of the plate member so that the thickness can be recognized, that is, seen from the sheet stack side when the blade is set in the cutting apparatus is referred to as "lower surface". A surface at the one side of the plate member seen along the longitudinal direction (cutting width direction) so that the thickness can be recognized is referred to as "side surface". Accordingly, FIG. 3A is a front view; FIG. 3B is a sectional side view taken along line PP; and FIG. 3C is a sectional side view taken along line QQ; and FIG. 3D is a view showing the lower surface.

Double-dot-dash lines in FIGS. 3A, 3B and 3C indicate an example of the position of the surface of the sheet at the uppermost position in the sheet stack to be cut. Accordingly, FIGS. 3A, 3B and 3C illustrate a state in which the projecting blade portions of the cutting blade 2 are thrust into the uppermost sheet. In the cutting blade 2 shown in FIGS. 3A to 3D, a ridge line capable of cutting is formed on a straight portion in the straight bottom portion 100. Accordingly, the straight bottom portion 100 has an included angle corresponding to the sharp ridge line, as shown in FIG. 3C.

The cutting blade 2 in FIGS. 3A to 3D is a member in a form of a plate, and has edges at the one side extending along the cutting width direction (horizontal direction as viewed in FIG. 3A). The cutting blade 2 is capable of cutting while it is reciprocated along the cutting width direction and moved in the cutting direction (downward as viewed in FIG. 3A). In the blade edge line of the cutting blade 2, the two projecting blade portions represented by tips 80 and 90 in FIG. 3A are capable of thrusting, with the tips 80 and 90 facing in the cutting direction as the vertices of the projecting ends. Each of the projecting blade portions is formed as a projecting edge in a shape of an equilateral triangle as a whole, as seen in the front view. Each projecting blade portion is preferably formed into the shape of an equilateral triangle. With the projecting blade portion in this way, equal shear angles can be defined along the two directions corresponding to the cutting width direction so that same mode of cutting is enabled in a sawing manner in the reciprocating movement. The shape of the projecting ends of the projecting blade portions is not limited to an acute-angled shape such as that of the above-described tip. Projecting ends may have a curved shape if they can be thrust into the sheet stack.

The projecting blade portion represented by the tip 80 is formed as a triangular projecting blade projecting in the cutting direction by: the tip 80 which is the projecting end; base points 81 and 82 which are base portions for the projecting blade portion; and two ridge lines 83 and 84 between the tip 80 and the base points 81 and 82. Similarly, the projecting blade portion represented by the tip 90 is formed as a triangular projecting blade projecting in the cutting direction by: the tip 90 which is the projecting end; base points 91 and 92 which are base portions for the projecting blade portion; and two ridge lines 93 and 94 between the tip 90 and the base points 91 and 92.

A straight bottom portion 100 having a straight portion is provided between adjacent two projecting blade portions. Opposite ends of the straight bottom portion 100 correspond to the base points 81 and 91 and are formed continuously with the projecting blade portions by being bent. In this case, a straight line connecting the base points 81 and 91 corresponds to the straight portion in the straight bottom portion 100. Preferably, the straight portion in the straight bottom portion 100 is disposed so as to be positioned parallel to the surface of the sheet in the uppermost position in the sheet stack to be cut.

The straight bottom portion 100 may include a round shape for continue to the projecting blade portions, by curved so as to have a circular-arc shape. Concentration of stress during cutting may be mitigated in this way. In some cases, a stepped portion may be provided to secure certain mechanical intensity of the base portions of the projecting blade portions. The base points 81 and 91 of the projecting blade portions are considered to correspond to intersection points of extensions of the ridge lines and the straight portion, for example, in a case where the round shapes are provided. In the case, the straight line connected to the intersection points at the opposite sides is considered to correspond to the straight portion in the straight bottom portion.

Referring to the side view of FIG. 3B and the bottom view of FIG. 3D, the projecting blade portion represented by the tip 80 has two faces (rake faces) forming the ridge 85 connecting to the tip 80, and a flank face 86 opposite from the rake faces. An included angle is formed between the ridge 85 and the flank face 86. Similarly, the projecting blade portion represented by the tip 90 has two faces (rake faces) forming the ridge 95 connecting to the tip 90, and a flank face opposite from the rake faces, and an included angle is formed between the ridge 95 and the flank face. Each flank face of the projecting blade portions adjacent to each other is formed as a flat surface continuously and flush with a face 102 defining the straight bottom portion 100 and shown in FIG. 3D. That is, in the cutting blade 2, the plate side surface represented by the flank face 86 and the face 102 is integrally formed as one flat surface.

Names of angles relating to the edges of the cutting blade will be described with respect to the projecting blade portion having the tip 80 shown in FIG. 3A by way of example. An angle formed by intersection of the two straight sides connecting the tip 80 and the two base points 81 and 82 is called an apex angle (vertical angle) of the projecting blade edge portion. An angle determined by an equation (A) "Shearing angle"=90−"apex angle"/2 in relation to this apex angle is called a shearing angle. An angle formed by the ridge 85 and the flank face 86 shown in FIG. 3B is called an included angle (knife angle) of the projecting blade portion having the tip 80.

For the cutting blade in the invention, the included angle is preferably 10 to 30 degrees, more preferably 15 to 25 degrees.

In the vicinities of the tips 80 and 90, i.e. the projecting ends, of the projecting blade portions thrusting into the sheet stack, a load for cutting the sheet stack is produced by the rake faces to act, thereby producing a wedge effect such that the projecting blade portion bends elastically toward the flank face as it escapes. When the included angle exceeds 30 degrees, the amount of the bending can be largely increased and the differences between the cutting track of the projecting blade portion and the cutting tracks of the other projecting blade portions become large, so that the possibility of occurrence of a malfunction as a practical issue, such as roughening of the cut portion or generation of a large amount of cutting dust, is increased. When the included angle is smaller than 10 degrees, mechanical strength of the projecting blade portions is reduced and the possibility of chipping of the projecting ends and the possibility of breakage of the base portions of the projecting blade portions are increased.

Behaviors of the edges of the cutting blade 2 when the sheet stack is cut with the cutting blade 2 will be described in detail.

When the cutting blade 2 is moved in the cutting direction to reach the sheet stack, the projecting ends, i.e. the tips 80 and 90, of the projecting blade portions are brought into contact with and caught by the sheet (not shown) in the uppermost position in the sheet stack positioned closest to the cutting blade 2. Then, the tips 80 and 90 of the projecting blade portions are thrust into the sheet by a load applied to the cutting blade 2 in the cutting direction. At this time, the sheet stack in the vicinity of the uppermost sheet is thrust and cut partially with the tip 80 and the ridge lines 83 and 84 connecting to the tip 80 and the tip 90 and the ridge lines 93 and 94 connecting to the tip 90.

The projecting blade portions in the thrust state are moved along the cutting width direction substantially simultaneously with the above thrusting operation. By the operation, the sheet stack in the vicinity of the uppermost sheet is cut in a sawing manner with the ridge lines 83 and 84 and the ridge lines 93 and 94. After the start of this saw-cutting operation, the projecting blade portions of the cutting blade 2 are further thrust into the sheets in lower positions by the load applied in the cutting direction while the sheet stack is cut in a sawing manner.

In a case of the cutting blade disclosed in JP-A-2010-89252, the projecting blade portions are thrust into the sheet stack by the load applied to the cutting blade in the cutting direction. In this case, the amount of thrust into the sheet stack varies largely depending on a shape of the projecting blade portions and a magnitude of the load. If the amount of thrust during repeated cutting of sheet stacks is extremely small, the load is concentrated on the projecting ends of the projecting blade portions and wearing of projecting ends is increased in an accelerating manner, so that thrusting performance is lost at an early stage and the required cutting time is increased earlier. If the amount of thrust is extremely large, an excessively large load is applied to the projecting blade portions, and not only wearing but also abnormal deformation or chipping of the projecting ends may be caused. Thus, in either case, difficulty due to wearing, for example, is encountered in maintaining the predetermined cutting quality and life.

In such a case, the cutting blade according to the invention is capable of limiting the amount of thrust of the projecting blade portions into the sheet stack to a predetermined amount due to the straight bottom portions between adjacent projecting blade portions. More specifically, the distance between the projecting ends of the projecting blade portions and the straight portion in the straight bottom portion in the vertical direction (nose height or edge height), i.e. a distance in the vertical direction between the tip 80 and the straight bottom portion 100 in the cutting blade 2 shown in FIGS. 3A to 3D, may be made equal to a predetermined amount of thrust.

In the arrangement, even when the projecting blade portions tried to thrust beyond the predetermined amount in the sheet stack, the straight portions in the straight bottom portions 100 touch the sheet stack to prevent from thrusting larger than the predetermined amount of thrust, and to limit the thrusting. When the straight portions in the straight bottom portions 100 touch the sheet stack, a pressure is produced on the straight portions by the load applied to the cutting blade 2 in the cutting direction. At the time, since a contact area with the sheet stack is increased by the straight portions, the cutting resistance is increased to prevent the cutting blade 2 from further thrusting into the sheet stack. It is also possible to cut the sheet stack in a sawing manner with the cutting blade 2 moved along the cutting width direction while preventing the cutting blade 2 from further thrusting into the sheet stack. Moreover, even when the load applied to the cutting blade in the cutting direction exceeds a proper value in the normal range, it is possible to prevent further thrusting of the cutting blade 2 due to the straight portions in the straight bottom portions 100, as described above, thus limiting the amount of thrust of the projecting blade portions into the sheet stack to the predetermined amount.

Thus, use of the cutting blade according to the invention having the construction in which straight bottom portions are formed between the projecting blade portions having edge lines enables properly controlling the amount of thrust of the projecting blade portions into the sheet stack and enables prevention of acceleration of wearing of the projecting blade portions in the vicinities of the projecting ends. As a result, the initial required cutting time can be maintained for long, and the cutting life of the cutting blade can be longer.

In the invention, it is desirable to form the straight portions in the straight bottom portions so that the length of the straight portions in the straight bottom portions or the length of the straight bottom portions 100 in the above-described cutting blade 2 is 1 mm or more in order to make full use of the above-described functions of the straight bottom portions. If the length of the straight portions is smaller than 1 mm, there is a possibility that the straight bottom portions brought into abutment on the sheet breaks the sheet and the projecting blade portions thrust through the sheet stack by greater amount than the predetermined one, although factors, such as the hardness or elasticity, may influence on this possibility. If a sheet stack with a possibility of such a phenomenon is to be cut, the distance between projecting ends of the projecting blade portions are made 1.5 mm or more, and more preferably 2 mm or more. If the distance may be increased, desired apex angle of the projecting ends of the projecting blade portions is easily secured and therefore, desired mechanical strength is obtained.

The cutting blade according to the invention can have a ridge line forming an edge line capable of cutting along the cutting width direction of the sheet stack, on the straight portion of each straight bottom portion, as that on the straight portion in the straight bottom portion 100 in the cutting blade 2 shown in FIGS. 3A to 3D. In a case of the ridge line in the cutting blade 2 shown in FIGS. 3A to 3D, a face 102 shown in FIG. 3C is a flank face, while a face 101 is a rake face.

Even though the ridge line forming an edge line capable of cutting is provided on each straight bottom portion as described above, a resistance to cutting by the ridge lines formed on the straight portion is higher than the resistance to the projecting blade portions. Therefore, thrusting of the projecting blade portions into the sheet stack is limited by the ridge lines brought into abutment on the sheet stack and the amount of thrust of the projecting blade portions can be properly controlled. Also, the edge lines on the straight portions can have a role on cutting of the sheet stack. That is, the ridge lines on the straight portions give rise to a press-cutting effect as well as cutting in a sawing manner.

The projecting blade portions of the cutting blade desirably have a projection in the direction vertical to the straight bottom portions. The projection is 0.05 mm to 1.0 mm from the straight bottom portion 100 to the tip 80 which is the projecting end, i.e., the edge height (nose height) of the projecting blade portions, in the above-described cutting blade 2. Thin paper sheets such as heat-sensitive paper ordinarily have a thickness of about 0.08 mm. Therefore, if the edge height is smaller than 0.05 mm, there is a possibility of failure to cut one sheet in one going and returning cycle of operation of the cutting blade and there is an anxiety about roughening of the cut end, generation of paper dust, or the like. A more preferable lower limit of the edge height is exceeding the thickness of a member to be cut (one sheet), for example, 0.1 mm in a case of sheets such as the heat-sensitive paper each having a thickness smaller than 100 μm, 0.3 mm in a case of sheets such as ordinary paper each having a thickness of 250 μm or less, and 0.4 mm in a case of sheets such as seal or label each having a thickness exceeding 250 μm.

On the other hand, if the edge height exceeds 1.0 mm, it is difficult that the projecting blade portions thrust close to the base portions so that the straight bottom portions abuts the sheet stack. Therefore, the provision of the straight bottom portions will not possibly effect. According to a study by the inventors, in a case where the projecting ends of the projecting blade portions have an apex angle of 60 degrees to 160 degrees (60 degrees to 10 degrees in terms of the shearing angle between the blade edge and the sheet stack), a suitable upper limit of the edge height is 0.5 mm when the sheets to be cut have a thickness of 250 μm or less, and the upper limit is 0.7 mm when the sheets have a thickness exceeding 250 μm.

It is desirable in the invention to make the apex angle of the projecting ends smaller and more acute (or to make the shearing angle larger) in order to improve the effect of the projecting ends of the projecting blade portions to bite and thrust into the uppermost sheet. By improving the thrusting effect, a rate of wearing of the projecting ends is reduced since an excessive sliding load on the projecting ends can be controlled since a sawing manner cutting has superiority.

However, if the apex angle of the projecting ends is made excessively small, the shearing angle becomes excessively large, and thus it results in an increase of resistance to sawing cutting. A reduction in mechanical strength is also caused and thereby a possibility of breakage is increased. It is, therefore, desirable to set the apex angle to 60 degrees to 160 degrees (60 degrees to 10 degrees in terms of shearing angle), more preferably 80 degrees to 140 degrees (50 degrees to 20 degrees in terms of shearing angle) in consideration of the edge height and properties of the member to be cut. In a case where the effect of sawing cutting is important, the apex angle is preferably made 100 degrees to 120 degrees (40 degrees to 30 degrees in terms of shearing angle).

It is also desirable that the interval between adjacent projecting blade portions or the distance (edge pitch) between two tips 80 and 90 in the cutting blade 2 is at least 2 mm or more. If the interval is smaller than 2 mm, the straight portions in the straight bottom portions does not have a sufficient length and a possibility of the malfunction is increased when the edge height is set to the necessary value as described above.

For example, in a case where the edge pitch is set to 2 mm and the effective cutting length (blade length) is set to 300 mm corresponding to the longitudinal length of the standard A4 size, a total number of projecting blade portions is about 150 pieces. In this case, a pressure per one edge (edge pressure) is set to 3 N, a total pressure acting on all edges (total edge pressure) for cutting in the cutting blade is about 450 N. If the edge pitch is reduced, the number of projecting blade portions is increased. Therefore, even if the pressure per one edge is small, the total edge pressure is increased and the cutting load is increased. If the cutting load is increased, a load applied to the cutting blade in the cutting direction is increased and an increase in output of the cutting blade drive source is required. An increase in a pressing force for holding the sheet stack at the time of cutting is also required. As a result, a compactness of the cutting apparatus is impaired and the manufacturing cost is also affected.

It is preferable to make the edge pitch as large as possible because the effect of e.g. improving cutting qualities and cutting life can be expected if the load on the projecting edges is reduced by reducing the edge pressure applied to the sheet stack through the projecting blade portions. However, a size of the cutting apparatus is correspondingly increased. In the invention, therefore, the upper limit of the edge pitch is set to 20 mm in consideration of compactness of the cutting apparatus. The edge pitch is desirably equal to or smaller than this value. For example, in a case where the edge pitch is 20 mm, a more compact cutting apparatus can be obtained if the amount of reciprocating movement of the cutting blade along the cutting width direction is set greater than 20 mm but not exceeding 25 mm.

Preferably, a ratio between following "Lx" to "Ly" may be set to Lx/Ly=0.10 to 0.40. Here, the "Lx" means a distance between each base point for the projecting blade portions, and the "Ly" means a distance between adjacent projecting tips of the projecting blade portions. For thus configured cutting blade, a straight portion has a sufficient length and each tip of the projecting blade portions has sufficient mechanical strength, thereby effective thrusting and saw cutting can be performed. When Lx/Ly=0.20 to 0.35, more effective thrusting and saw cutting can be performed. For example, the edge pitch of the adjacent projecting blade portions was 2.5 mm, the edge height of the projecting blade portions was 0.3 mm, and an apex angle of the tips was 100 degrees. In the case, Lx/Ly=0.29 and a length of a straight portion is 1.7 mm.

Also, in the invention, it is preferable to set the load per one edge (same as edge pressure) acting on each edge to 0.2 to 5 N. For instance, when a sheet stack of papers was cut, it was possible to cut the sheet stack by setting an amount of thrust to 0.1 to 0.2 mm. The inventors compared a case of (edge height, edge pitch)=(0.3 mm, 5 mm) and a case of (edge height, edge pitch)=(0.3 mm, 2.5 mm) and confirmed that good quality is obtained in each case even when the thickness of one sheet was smaller than 0.1 mm. The inventors also confirmed that, in the former case, i.e., the larger edge pitch, the uppermost sheet was not moved by drawn along the cutting width direction when the projecting blade portions bit.

In the invention, a plate member made of a material favorable as a cutter material and having a desired size can be used for the cutting blade. As a material, these materials can be used. For example, a plate member made of steel for cutting tools, high-speed tool steel, high-speed tool steel metal powder is sintered, or the like. Further, depending on a material, a plate member made of chromium nitride coated, diamond-like carbon coated material or the like, a plate member made of a sintered hard alloy, a plate member made of a ceramic or a plate member of a similar structure to a metal band saw which is made by welding an edge member and a body member to each other, or the like. In consideration of thrusting or intrusion into a cut portion, it is desirable that the plate member has a thickness of 2 mm or less. A thinner plate member having a thickness of 0.3 mm, 0.7 mm or 1.2 mm, for example, is preferred.

In forming the cutting blade, an edge shape on a side which forms a rake face can be formed by, for example, polishing with a grinding wheel having a shape corresponding to the projecting edge, wire cutting, grinding, or the like to a corresponding flat plate surface. Also, it is desirable that the edge shape on a side which forms a flank face is as smoothly as possible by surface polishing or the like in order to reduce a sliding resistance at the time of cutting and to obtain a good cut surface quality.

A preferable arrangement according to the invention will be described below with reference to FIGS. 1 to 3. In the drawings, a reference numeral 1 denotes a cutting apparatus; 2 denotes a cutting blade; 2*a* denotes a projecting blade portion; 3 denotes reciprocating means; 3*a* denotes a cutting blade holding member; 3*b* denotes a linear slider; 3*c* denotes an eccentric cam; 3*d* denotes a motor; 4 denotes cutting direction movement means; 4*a* denotes a slide frame; 4*b* denotes a linear slider; 4*c* denotes a weight container; 4*d* denotes a stopper; 4*e* denotes an abutment surface; 5 denotes pressing means; 5*a* denotes a pressing plate; 5*b* denotes a fixed frame; 5*c* denotes a bolt member; 6 denotes a placement table; 7 denotes a receiving member; 8 denotes a guide member; 9 denotes a frame base; 10 denotes a weight; 11 denotes an arrow; 80 denotes a tip; 81 and 82 denote a base portion; 83 and 84 denote a ridge line; 85 denotes a ridge; 86 denotes a flank face; 90 denotes a tip; 91 and 92 denotes a base portion; 93 and 94 denote a ridge line; 95 denotes a ridge; 100 denotes a straight bottom portion; 101 and 102 denote a face; and S denotes a sheet stack.

Reciprocating the cutting blade 2 along the cutting width direction in the cutting apparatus 1 shown in FIG. 1 has advantages that a length of the cutting blade 2 along the cutting width direction can be reduced. Here, the reciprocation is a process in which the direction of movement of the cutting blade 2 is moved in one direction along the cutting width direction and then inverted at a predetermined position and the cutting blade 2 is moved in the opposite direction. If the length of the cutting blade 2 along the cutting width direction is reduced, the movement of the reciprocating cutting blade is equal to or larger than the length of the cutting blade 2 along the cutting width direction.

Therefore, the effective length of the cutting blade 2 along the cutting width direction, i.e. the blade length (Lc) of the edge line through which cutting with the cutting blade 2 can be performed, may be set larger than the value obtained by subtracting the amount of reciprocating movement of the cutting blade 2 from the width of the sheet stack. Thus, an equation: $Lc>Ls-2X$ is satisfied in the relationship between the width size (Ls) of the sheet stack to be cut and the amount (X) of going movement of the cutting blade 2 and the amount (X) of returning movement of the cutting blade 2. For example, in a case of cutting an A4 standard sheet stack along the longitudinal direction (lengthwise direction), the width (Ls) of the sheet stack is 297 mm, and the blade length (Lc) of the edge lines of the cutting blade 2 may be set at least larger than 277 mm when the amount (2×) of reciprocating movement of the cutting blade 2 is set to 20 mm. This arrangement is advantageous in terms of reducing a weight of the cutting apparatus and making the cutting apparatus compact.

Going and returning movements of the cutting blade 2 is desirably larger than the edge pitch of the projecting blade portions 2*a* but not larger than 10 times of the edge pitch. It is more desirable that the movement is 2 times to 5 times of the edge pitch and that cutting track of adjacent projecting blade portions 2*a* are suitably overlapped so that cutting can be performed with reliability. More specifically, since the preferable range of the edge pitch of the projecting blade portions 2*a* is 2 mm to 20 mm as described above, it is desirable that each of the going and returning movements of the cutting blade 2 in relation to the edge pitch is more than 2 mm but not more than 200 mm, more desirably, from 4 mm to 100 mm. In this way, a compact cutting apparatus suitable for the sheet stack size standard can be obtained with a simple structure.

If the amount of movement of the cutting blade 2 is set to 2 mm or less, there is a possibility of incomplete cutting of the sheet stack in relation to the edge pitch. Moreover, if the period of reciprocation of the cutting blade 2 along the cutting width direction is reduced, there is a possibility of generation of vibration or noise that discomforts people around the apparatus. Also, if the amount of movement of the cutting blade 2 is set larger than 100 mm, a size of the mechanism for reciprocating the cutting blade 2 along the cutting width direction is increased and compactness may be impaired.

It is also desirable that a load (Cw) applied to the cutting blade 2 in the cutting direction has a relationship with a number (Cp) of projecting blade portions and the above edge pressure (Cf) such that an equation $Cw=Cf \times Cp$ is satisfied. It is preferable to consider relationships with various factors such as a shape and a number of projecting blade portions 2*a* of the cutting blade 2, a magnitude of a drive force for reciprocating the cutting blade 2 along the cutting width direction, a cut length, a thickness and a material of the sheet stack to be cut and the time required for cutting the sheet stack. Since the edge pressure is desirably 0.2 N to 5 N as described above, the load Cw is 0.2 Cp to 5 Cp (unit: N). For practical use, e.g. an output of the drive source, mechanical strength of the structure of the apparatus, compactness of the apparatus should be considered. The load is desirably controlled from 200 N to 600 N.

As the cutting apparatus 1 as shown in FIG. 1, for the means for applying the load to the cutting blade 2 in the cutting direction, there is a way to use the plummet 10 with its weight directly. In addition, various load application mechanisms can be employed. For example, a pressing means for using a motor-driven cylinder, a lever mechanism or the like for pressing a member corresponding to the slide frame 4*a*, is used as the pressing force applied load. Also, a means for converting a rotational torque of a motor into a linear motion using an eccentric cam is used as the pressing force applied load at that time. In a case of using the cutting blade 2, the load in the cutting direction on the cutting blade 2 corresponds to the load when the cutting blade 2 is thrust into the sheet stack and may include the weight of the cutting blade 2 and the weight a supporting member or the like moving together with the cutting blade 2.

The receiving member 7 for receiving the projecting blade portions 2*a* of the cutting blade 2 in the cutting apparatus 1 is preferably set as follows. When the cutting blade 2 reaches the lowermost position in the cutting direction, the projecting ends of the projecting blade portions 2*a* are brought into abutment on the receiving surface of the receiving member 7 or the projecting ends of the projecting blade portions 2*a* slightly bite the receiving surface. The material of the receiving surface of the receiving member 7 may be a plastic or rubber based material, e.g. polyvinyl chloride, urethane, or natural rubber and preferably a material used for cutting mats on market, e.g. polypropylene or the like.

EXAMPLES

A sheet stack cutting apparatus having a structure similar to the cutting apparatus 1 as shown in FIG. 1 was actually produced (invention apparatus) and a sheet stack was cut with the apparatus. A cutting test piece is a sheet stack in a booklet composed of 40 sheets of ordinary paper (Ricoh Company, Ltd., PPC paper type 600, thickness: about 90 μm), which are of A4 standard size generally used (297 mm height×210 mm width). A portion along the longitudinal direction of the sheet stack (cutting width: 297 mm) was cut. Reference will be made to the names relating to the invention apparatus in FIGS. 1 to 3.

As the cutting blade 2 installed in the apparatus, a plate having a 0.7 mm thick made of JIS specified SKH51 coated with chromium nitride was used. The projecting blade portions 2*a* was made such that the edge pitch was 2.5 mm; the edge height was 0.3 mm; the triangle apex angle of the tips as seen in front view was 100 degrees (shearing angle: 40 degrees); and the included angle as seen in side view was 15 degrees. The tips (projecting ends) were polished to R 0.1 mm or smaller to secure the sharpness. A straight bottom portion 100 including a 1.7 mm straight portion was provided between projecting blade portions 2*a*, and a ridge line at an edge angle of 15 degrees forming an edge line was formed on the straight portion. The entire width of the cutting blade 2 was 305 mm and a blade length of 300 mm exceeding at least the cutting width was secured. Each of the amount of going and returning movements of the cutting blade 2 along the cutting width direction was set to 5 mm (reciprocating width: 10 mm) corresponding to twice the edge pitch. The edge pressure acting on the projecting blade portions 2*a* was set to 3 N. Thus, a standard value of the load applied to the cutting blade 2 in the cutting direction was set to 400 N. Weights of each member affecting the load was adjusted and an output of the drive source was controlled.

A cutting test was repeated, where the test piece was cut by the apparatus having the above construction. As a result, even after the repetition reached a number (50,000 times) assumed to be an ordinary cutting life, wearing of the projecting ends (corresponding to the tips 80 and 90 shown in FIGS. 3A to 3D) of the projecting blade portions 2*a* was not accelerated. Also, the time required for cutting the test piece was not substantially increased from the beginning of the test. The amount of wearing of the projecting ends of the projecting blade portions 2*a* measured after 50,000 times was about 0.2 mm. Also, the cut surface of the cutting test piece has good cutting quality even after the repetitions of 50,000 times cutting, and any malfunction in practice use was not found.

The cutting test was made by using a conventional apparatus in order to confirm the effects of the invention.

The conventional apparatus includes a same main body as the invention apparatus, but a cutting blade has a curved bottom portion concave in a direction away from the sheet stack, between adjacent projecting blade portions in place of the cutting blade 2 of the invention. That is, difference between the invention apparatus and the conventional apparatus reside in whether a straight bottom portion is provided between adjacent projecting blade portions (invention apparatus) or a curved bottom portion is provided (conventional apparatus) in the cutting blade. Same size of each portion, edge pressure and load, and amount of reciprocating movement of the cutting blade were applied as those described above.

The same cutting test was made and repeated by using the conventional apparatus as described above. As a result of the conventional apparatus, wearing of the projecting ends of the projecting blade portions was increased rapidly, and the required cutting time was increased to impair practicality when the number of repetitions of cutting reached 30,000 times. The amount of wearing of the projecting ends measured at this time was about 0.3 mm. The cutting test was further repeated, but cutting of the sheet stack became incomplete. The test was stopped without reaching 50,000 times.

From the results of the cutting test using the invention apparatus and the conventional apparatus, followings were confirmed. In the sheet stack cutting apparatus of the invention, wearing of the projecting blade portions was controlled by the effect of the straight bottom portion between the projecting blade portions of the cutting blade. The invention apparatus was able to cut the sheet stacks within a practical required cutting time at least until the number of repetitions of 50,000 times. The cutting life was able to be elongated in comparison with that of the conventional apparatus.

The invention claimed is:

1. An apparatus for cutting a sheet stack composed of a plurality of sheets, the apparatus comprising a placement table having an upper surface on which the sheet stack is placed, and a cutting blade having a plate form and having a cutting edge at one side extending along a cutting width direction, the cutting blade having at the one side a plurality of projecting blade portions comprising a plurality of tips, and each of the plurality of projecting blade portions having ridge lines forming edge lines capable of thrusting and sawing cutting, the projecting blade portions projecting in a cutting direction, and a straight bottom portion between adjacent projecting blade portions, wherein the straight bottom portion has a straight portion that is parallel to the upper surface of the placement table, wherein cutting of the sheet stack is performed by applying a load to the cutting blade in the cutting direction, and by reciprocating the cutting blade along the cutting width direction, wherein the projecting blade portions project from the straight bottom portion to a projecting end defined by the plurality of tips in a direction perpendicular to the straight bottom portion by 0.05 mm to 1.0 mm, wherein a distance between the tips of the projecting blade portions that are adjacent is not smaller than 1.5 mm, wherein the projecting blade portions and straight bottom portions are alternately arranged, and wherein the tips of the projecting blade portions are arranged at an equal interval.

2. The apparatus according to claim 1, wherein the straight portion has a length of not shorter than 1 mm.

3. The apparatus according to claim 1, wherein the straight bottom portion has an edge line cutting the sheet stack along the cutting width direction.

4. The apparatus according to claim 1, wherein the projecting blade portions have a distance (Ly) between the tips of the projecting blade portions which are adjacent, and a distance (Lx) between each base point for the projecting blade portions, a ratio Lx to Ly (Lx/Ly) being 0.10 to 0.40.

5. The apparatus according to claim 1, wherein opposite ends of the straight bottom portion correspond to base points of two adjacent projecting blade portions and the straight bottom portion is formed continuously with the projecting blade portions.

* * * * *